United States Patent
Klecker et al.

(10) Patent No.: US 6,244,965 B1
(45) Date of Patent: *Jun. 12, 2001

(54) CONTROLLABLE OVERRUNNING COUPLING

(75) Inventors: Brian D. Klecker, Chesterfield; Sharon Harrison, Petersburg, both of VA (US)

(73) Assignee: Means Industries, Inc., Saginaw, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,202

(22) Filed: Apr. 28, 1998

Related U.S. Application Data

(60) Provisional application No. 60/100,431, filed on Apr. 28, 1997.

(51) Int. Cl.[7] .................................................. F16D 41/12
(52) U.S. Cl. ........................ 464/81; 192/43.1; 192/69.1
(58) Field of Search ................................. 464/1, 30, 81, 464/84, 100, 101, 147; 192/43.1, 69.1

(56) References Cited

U.S. PATENT DOCUMENTS

| | | |
|---|---|---|
| 2,137,643 | 11/1938 | Cirac et al. . |
| 4,049,099 * | 9/1977 | Zeigler ................................ 192/46 X |
| 4,470,494 * | 9/1984 | Takeuchi ...................... 192/106.2 X |
| 5,070,097 | 12/1991 | Pires . |
| 5,070,978 | 12/1991 | Pires . |
| 5,170,676 * | 12/1992 | Matouka et al. ................... 74/411 X |
| 5,170,870 | 12/1992 | Kämpf . |
| 5,449,057 | 9/1995 | Frank . |
| 5,597,057 | 1/1997 | Ruth et al. . |
| 5,699,889 | 12/1997 | Gadd . |
| 5,871,071 * | 2/1999 | Sink .................................... 192/46 X |
| 5,918,715 * | 7/1999 | Ruth et al. ......................... 192/46 X |
| 5,927,455 | 7/1999 | Baker et al. . |
| 5,937,980 * | 8/1999 | Dick ................................... 192/43.1 |

FOREIGN PATENT DOCUMENTS

| | | | |
|---|---|---|---|
| 2613788 * | 10/1977 | (DE) | ..................................... 464/30 |
| 24665 * | 4/1913 | (GB) | ....................................... 464/1 |
| 1546083 * | 5/1979 | (GB) | ..................................... 464/100 |
| 2152157 | 7/1985 | (GB) . | |
| 1318752 * | 6/1987 | (SU) | .................................. 192/43.1 |
| 1333909 * | 8/1987 | (SU) | .................................. 192/43.1 |

* cited by examiner

Primary Examiner—Harry C. Kim
(74) Attorney, Agent, or Firm—Brooks & Kushman P.C.

(57) ABSTRACT

A planar overrunning coupling for transfer of torque from a driving member to a driven member in one direction and which permits freewheeling motion between the members upon a torque reversal, the coupling comprising coupling plates situated in close proximity with a strut retainer plate disposed between them, one plate being connected to the driving member and the other plate being connected to the driven member, each plate having strut recesses, a series of struts located in the recesses of one plate so that each strut may be pivoted, thereby allowing the struts to engage the companion recesses in the other coupling plate, the retainer having angularly spaced apertures that register with the struts to permit pivotal movement of the struts when the retainer plate is in one rotary position, the retainer plate, when it is in a second rotary position, preventing pivotal motion of the struts, thereby permitting freewheeling relative motion of the coupling plates.

14 Claims, 7 Drawing Sheets

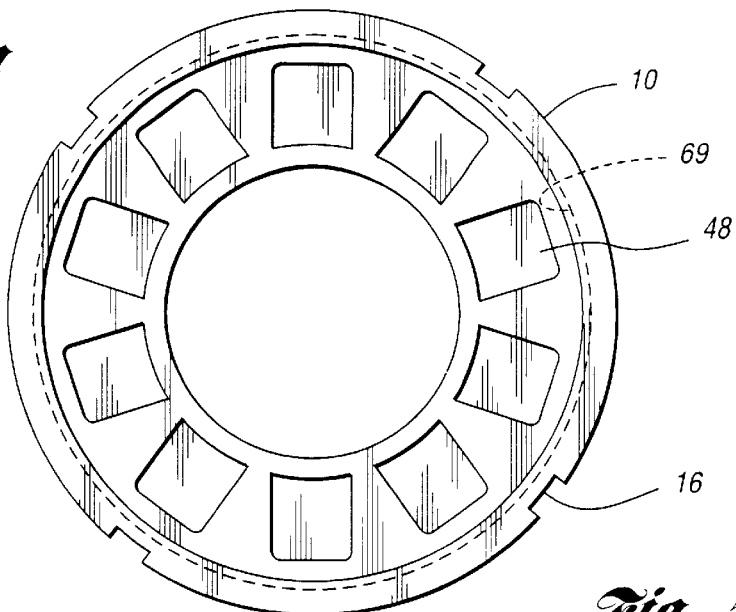
Fig. 5a
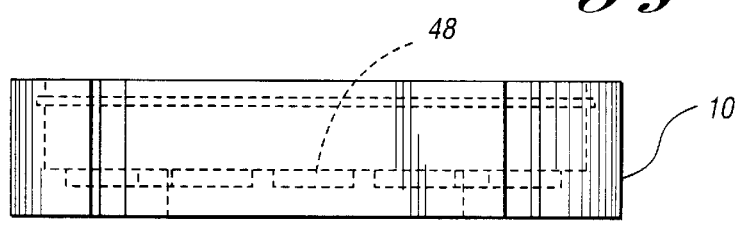
Fig. 5b
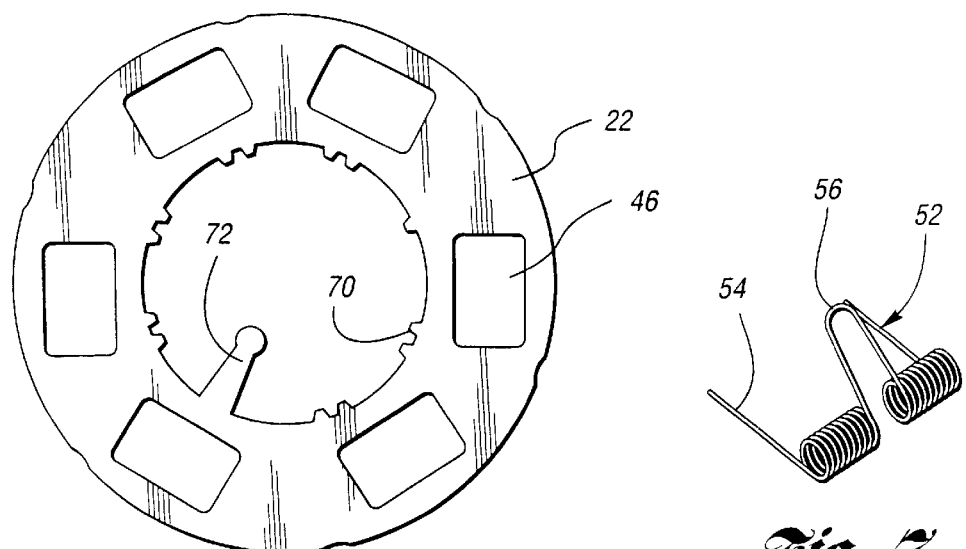
Fig. 6a
Fig. 6b
Fig. 7

CONTROLLABLE OVERRUNNING COUPLING

This application claims the benefit of U.S. Provisional Application No. 60/100,431 filed by the same inventors on Apr. 28, 1997, and entitled 'CONTROLLABLE OVERRUNNING COUPLING'.

TECHNICAL FIELD

The invention relates to torque transmitting couplings for accommodating torque transfer from a driving member to a driven member, but which will permit freewheeling overrunning motion of the driving and driven members upon a torque reversal.

BACKGROUND OF THE INVENTION

Overrunning coupling assemblies are used for transferring torque from a driving member to a driven member in a variety of structural environments. This permits the transfer of torque from a driving member to a driven member while permitting freewheeling motion of the driving member relative to the driven member when torque is interrupted. Such couplings often comprise an outer race concentrically disposed with respect to an inner race, the outer race having cammed surfaces that define a pocket in which coupling rollers are assembled.

A driving member is connected to one race, and a driven member is connected to the other race. During torque transfer from the driving member to the driven member, the rollers become locked with a camming action against the cam surfaces, thereby establishing a positive driving connection between the driving member and the driven member. When the torque is interrupted, the driven member may freewheel relative to the driving member as the rollers become unlocked from their respective cam surfaces.

Another common overrunning coupling includes inner and outer races wherein one race is connected to a driving member and the other race is connected to the driven member. Overrunning coupling sprags are disposed between the inner cylindrical surface of the outer race and the outer cylindrical surface of the inner race so that the sprags lock the races together as torque is delivered to the driven member. The sprags become unlocked with respect to the inner and outer race surfaces when torque transfer is interrupted.

Unlike overrunning roller clutches and overrunning sprag clutches commonly used in torque transfer mechanisms, the improved coupling of this invention comprises planar coupling plates situated in close juxtaposed relationship. The plates are mounted on a common axis of rotation. Each planar coupling plate has strut recesses. One of the coupling plates receives torque-transmitting struts, which are pivoted about the respective edges of the plate recesses. The opposite edge of each strut is adapted to be received in a cooperating recess formed in the companion coupling plate. Upon torque interruption, the struts will become disengaged from the driven coupling plate and will pivot about their respective pivot edges, thereby causing them to be substantially enclosed in the recesses of the driving coupling plate. When the struts are positioned in this fashion, free-wheeling motion of the coupling plates may take place, one with respect to the other.

Described in co-pending patent application Ser. 08/871, 192, filed Jun. 9, 1997, now U.S. Pat. No. 5,918,715 entitled "Overrunning Planar Clutch Assembly", is a planar coupling having struts and individual strut springs that normally urge the struts about the strut pivotal axis the recesses in the driven coupling plate. When the driving member transfers torque to the driven member in one direction, the struts will become locked in the recesses of the driven coupling plate. If the driven coupling plate overruns the driving coupling plate when torque transfer is interrupted, the struts will ratchet over the recesses of the driven plate.

BRIEF DESCRIPTION OF THE INVENTION

The improved planar coupling assembly of this invention controls the motion of the struts by preventing pivotal motion of the struts about their respective pivot axes when the coupling plates are in a free-wheeling mode. Provision is made, however, for allowing the struts to pivot about their respective pivotal axes so that the active edge of each strut may engage the recesses of the driven coupling plate during torque transfer from the driving member to the driven member. This control of the position of the struts is achieved in our improved design by a strut retainer plate, which is situated in the coupling assembly in coaxial disposition with respect to the driving member and the driven member.

The strut retainer plate includes angularly spaced apertures that allow the struts to pivot about their respective axes into engagement with the recesses of the driven plate when the strut retainer plate is in one axial position. When the strut retainer plate is shifted rotatably to another angular position relative to the driving plate, the recesses in the strut retainer plate will not be in full registry with the recesses of the driving plate. The strut retainer plate, when it is thus positioned, will prevent the struts in the recesses of the driving plate from moving about their respective pivotal axes. This eliminates the ratcheting condition described in the preceding discussion and substantially reduces the possibility of wear of the relatively movable coupling members. The planar coupling assembly is particularly adapted for high speed operating conditions and for operation under low volume lubricating oil operating conditions.

Any noise that would be associated with ratcheting of the struts over the recesses of the driven plate is eliminated in our improved coupling. Further, manufacture of our improved coupling does not require the precision machining operations that are required in the manufacture of conventional sprag couplings and roller couplings. Many of the components may be manufactured using powder metal casting and forming techniques.

According to a second embodiment of the invention, the strut retainer plate is designed with three operating states, each of which is characterized by a separate angular position of the strut retainer plate relative to the coupling driving plate.

When the strut retainer plate assumes a first position relative to the coupling driving plate, the struts are allowed to pivot about their respective pivotal edges, thereby allowing the struts to pass through the apertures in the strut retainer plate and enter a first series of recesses in the driven coupling plate when the strut retainer plate assumes a first operating position. This permits torque transfer in a direction from the driving member to the driven member.

The driving coupling plate for this second embodiment of the invention includes also a second series of recesses in which are positioned individual struts that are allowed to pivot about one edge in an angular direction opposite to the angular direction of the pivotal motion of struts in the first series of recesses. As in the case of the struts for the first series of recesses in the driving plate, the struts in the second series of recesses in the driving plate are allowed to pass through the apertures in the strut retainer plate when the strut retainer plate assumes a second operating position. This will permit torque to be transferred in the opposite direction between the driving and driven members as the struts in the second series of recesses of the driving plate engage one edge of the recesses in the driven coupling plate.

When the strut retainer plate assumes a third operating position intermediate the first and second positions, the struts of each set are held within their respective recesses, thereby permitting free-wheeling motion of the driving plate and the driven plate, one with respect to the other.

When the strut retainer plate is in the first position, as discussed above, the strut retainer plate will hold the struts of the second series of recesses in their respective recesses and pivotal motion of those struts will be prevented.

DESCRIPTION OF THE DRAWINGS

FIG. 5a is a plan view of a driven clutch plate for the coupling assembly of FIGS. 1, 2 and 3;

FIG. 5b is an end elevation view of the coupling plate of FIG. 5a;

FIG. 6a is a plan view of a strut retainer plate, which is located between the planar coupling driving plate and the planar coupling driven plate as indicated in FIG. 4;

FIG. 6b is an end elevation view of the retainer plate of FIG. 6a;

FIG. 7 is a detailed perspective view of the strut springs that are located in recesses formed in the planar coupling driving plate;

FIG. 8b is an end elevation view of the coupling plate of FIG. 8a;

FIG. 9a is a plan view of a strut that is adapted to be located in the recesses of the plate shown in FIG. 8a;

FIG. 9b is an end elevation view of the strut of FIG. 9a;

FIG. 11b is a side elevation view of the driving shaft of FIG. 11a;

PARTICULAR DESCRIPTION OF THE INVENTION

Figure 1:
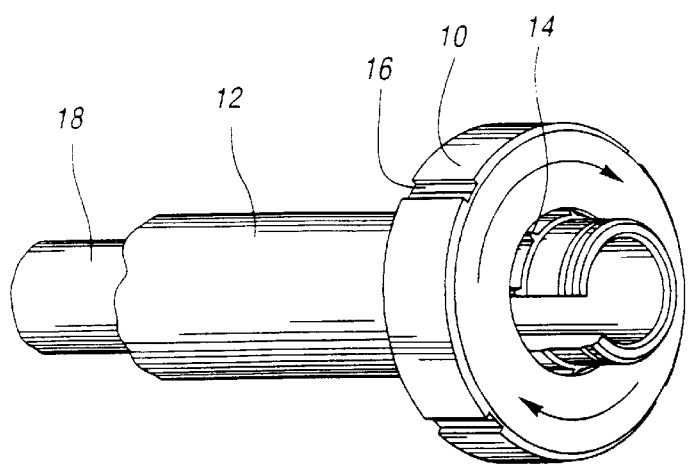
FIG. 1 is a perspective view of an overrunning coupling assembly wherein torque is transferred from a driving shaft to a driven coupling plate and which will permit free-wheeling motion in a clockwise direction.

FIG. 1 shows at 10 a driven plate of a planar coupling assembly. Not shown in FIG. 1 is a driving coupling plate that is nested within the driven coupling plate. The driving coupling plate is drivably connected to a torque input shaft 12. This driving connection is established by internal splines formed on the driving coupling plate, which drivably engage external splines 14 on the shaft 12.

The driven coupling plate 10 may be provided with drive keyways 16 which, in turn, establish a driving connection with a driven coupling member, for example, in a power transmission mechanism.

Figure 14:
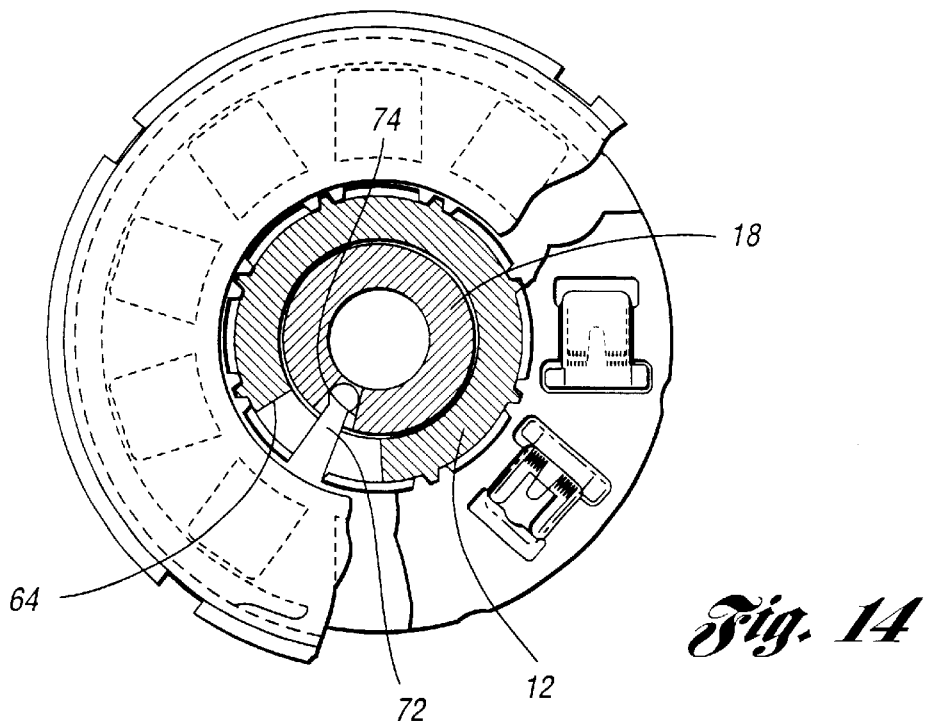
FIG. 14 is a plan view partly in section of the coupling assembly of the invention wherein a central actuator shaft is situated within the coupling plates.

A strut retainer actuator shaft 18 is situated within the torque input shaft 12. This actuator shaft is best seen in FIG. 14. It may be oscillated about its axis so that its angular disposition relative to the shaft 12 can be changed. Actuator shaft 18 is drivably connected to a strut retainer plate, which will be described subsequently, thereby causing the strut retainer plate to be adjusted angularly with respect to the axis of the shaft 12.

Figure 2:
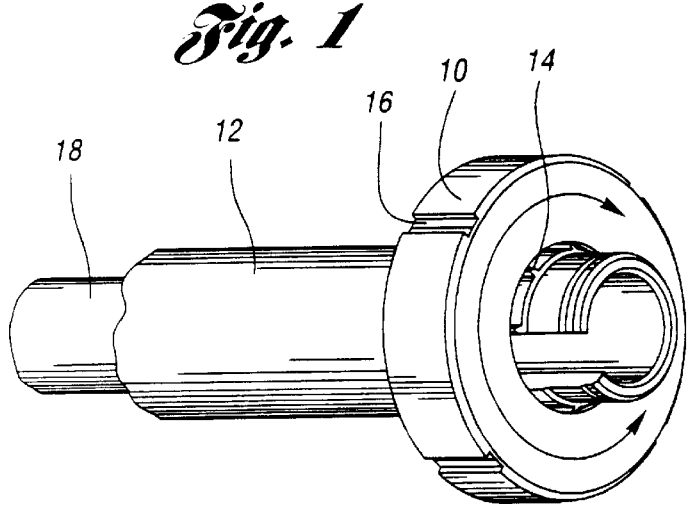
FIG. 2 is a view similar to FIG. 1 indicating the operating mode in which free-wheeling motion is permitted in each direction.

FIG. 2 corresponds to FIG. 14. FIG. 2 indicates, however, that the driven coupling plate 10 can free-wheel in both angular directions. This is illustrated by the bi-directional arrow shown in FIG. 2. The bi-directional free-wheeling motion is achieved in the operating mode illustrated in FIG. 2 as the actuator shaft 18 is adjusted on its axis relative to the shaft 12 to a position intermediate the position that effects torque transfer in a first direction and a position that effects torque transfer in the opposite direction.

Figure 3:
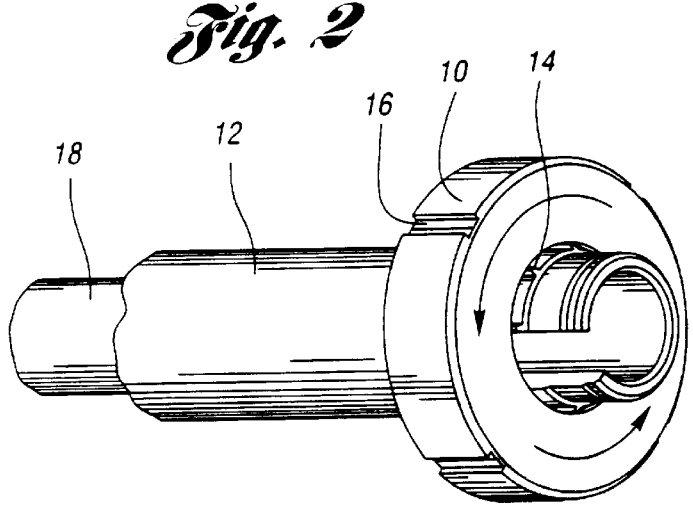
FIG. 3 is a view similar to FIGS. 1 and 2 indicating that torque may be transferred from a driving shaft to a driven coupling plate while permitting free-wheeling motion in a counterclockwise direction.

FIG. 3 is a view similar to FIGS. 1 and 2, but it illustrates a single directional arrow. This arrow designates the free-wheeling motion in a direction opposite to the direction of free-wheeling motion of FIG. 1, although torque transfer in the opposite direction is effected. The operating mode shown in FIG. 3 is achieved by adjusting the actuator shaft 18 to a third operating position relative to the shaft 12, thereby adjusting the strut retainer plate to a torque transfer position opposite to the torque transfer position for the operating mode illustrated in FIG. 1.

Figure 4:
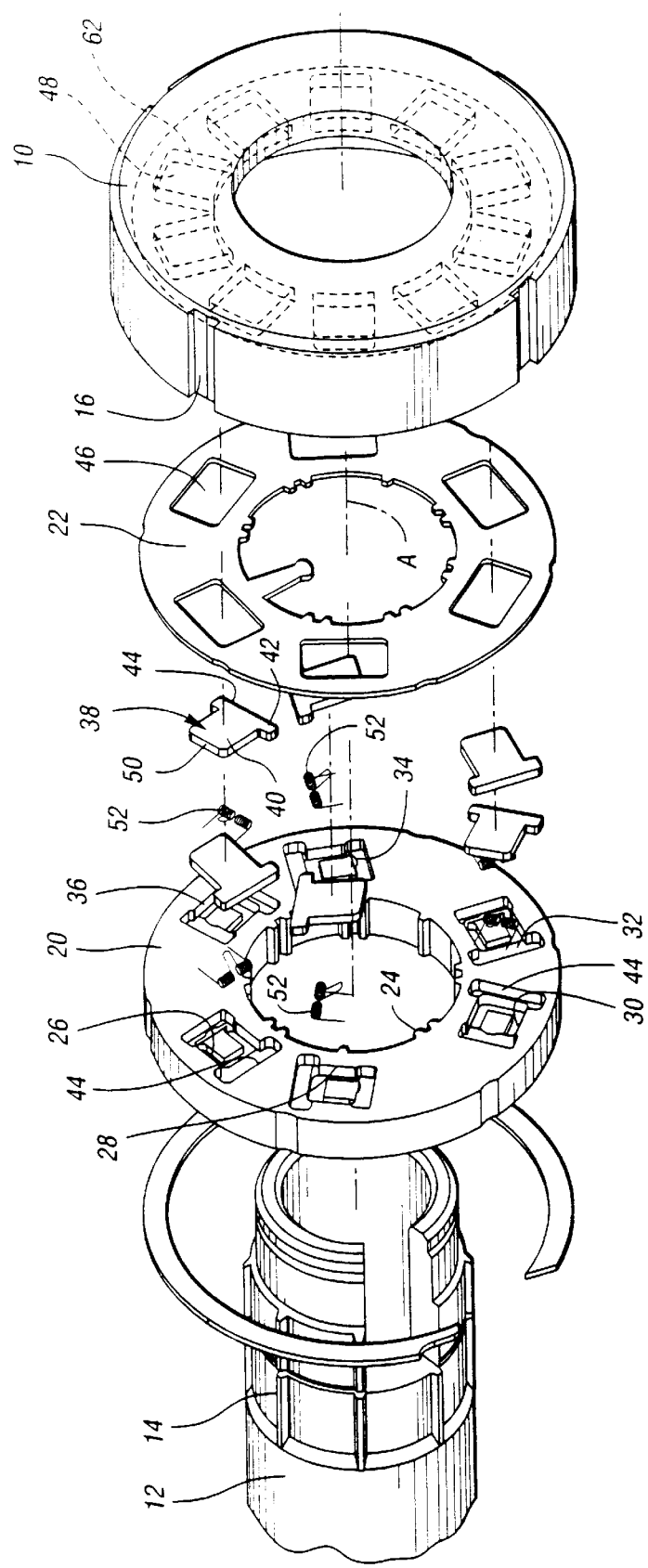
FIG. 4 is a partial exploded assembly view of the planar coupling illustrated in FIGS. 1, 2 and 3.

In FIG. 4, we have illustrated the clutch assembly in an exploded view. The driving coupling plate, as shown at 20, is adapted to be received in the driven clutch plate 10. Located intermediate the juxtaposed faces of the coupling plate 20 and the coupling plate 10 is a strut retainer plate 22.

The driving coupling plate is provided with splines 24, which engage drivably the external splines 14 on the shaft 12.

Coupling plate 20 has a series of recesses 26 and a second series of recesses 28. One recess 26 and a companion recess 28 are situated at a first angular position which is displaced 120° from a second position at which is located at a second set of recesses 30 and 32. It is displaced also 120° from a third set of recesses shown at 34 and 36.

There are six struts 38 received in the six recesses in driving coupling plate 20. Each strut comprises a planar substantially rectangular portion 40 and a pair of ears 42, the latter being located at one margin of the strut. The edge of the strut on which are formed the ears 42 defines a pivotal edge that registers with one edge 44 of its companion recess.

As seen in FIG. 4, the pivotal edge of the strut in recess 26 is located proximate to the pivotal edge 44 for the adjacent strut in recess 28 at the first angular position. Similarly, the pivotal edges for the struts located at the second angular position are located in close proximity, one with respect to the other. This is true also of the struts for recesses 34 and 36 at the third angular position.

The strut retainer plate 22 is provided six apertures 46. These are arranged angularly about the axis of the clutch, which is shown at A. The six apertures 46 are arranged in pairs, each pair being disposed 120° out of position with respect to the other pairs of recesses.

When the retainer plate 22 is appropriately positioned for torque transfer in one direction, one aperture 46 will be disposed directly over the recess 26, another will be disposed directly over the recess 30, and another will be disposed directly over recess 34. Thus, one recess will be disposed over one recess of each pair of recesses in the plate 20.

When the retainer plate 22 is adjusted angularly in the opposite direction, the recesses 28, 32 and 36 will be in direct registry with one of the apertures 46.

The driven plate 10 is provided with angularly spaced recesses 48 in its internal planar face. These recesses are evenly spaced about the axis 48 and are arranged at a radial location corresponding to the radial location of the recesses in the driving plate 20.

The apertures 46 and the recesses 48 are sized so that the edges 50 of the struts 38 can enter the recesses 48 in the plate 10 and engage one edge of the recesses 48 to establish a locking action between the struts and the plate 10 that will permit torque transfer between plate 20 and plate 10.

If plate 22 is adjusted about axis A such that the recess 26 fully registers with an aperture 46, recess 28 will be out of registry with the adjacent aperture 46 and will be at least partially covered by the retainer plate 22. Thus, the strut located at recess 28 will be held in place in the recess 28 to prevent pivotal motion about the pivotal edge 44. This prevents entry of the strut into the recesses 48 of the clutch plate 10. Similarly, when the recess 30 fully registers with an aperture 46, the recess 32 will be at least partially covered by the plate 22. Further, when the recess 34 fully registers with an aperture 46, recess 36 will be at least partially covered by the retainer plate 22. This permits torque transfer from plate 20 to plate 10 in one direction.

If the plate 22 is adjusted about the axis A so that the apertures 46 register with recesses 28, 32 and 36, the struts in those recesses may pass through apertures 46 and engage the opposite edge of the recesses 48 in the plate 10. At the same time, recesses 26, 30 and 34 will be at least partially covered by the plate 22 to prevent the struts located in those recesses from pivoting and registering with a recess 48. This permits torque transfer from the plate 20 to the plate 10 in the opposite direction.

If the retainer plate 22 is adjusted to a third position intermediate the two torque transfer positions, both pairs of struts in the recesses 26 and 28 will be at least partially covered by retainer plate 22 and prevented from moving pivotally about their respective pivotal edges. Similarly, the struts located in the recesses 30 and 32 will be prevented from pivotal movement as will the struts in recesses 34 and 36. When the retainer plate 22 is thus positioned, the plate 20 and the plate 10 can free-wheel, one with respect to the other, in either direction.

As seen in FIG. 5a, the driven coupling plate 10 has its recesses 48 equally spaced about the axis A of coupling. They are strategically positioned so that three of them will permit engagement of one of each of the three pairs of struts carried by the driving plate 20. During torque transfer in the opposite direction, the strategic position of the recesses 48 will permit engagement of the other strut of each of the three pairs of struts in the coupling plate 20.

Although any suitable strut spring can be used with the invention, FIG. 7 shows in perspective a strut spring 52 used in this embodiment of the invention. One spring 52 is located under each strut. The springs 52 are located in the recesses formed in the plate 20. Spring reaction arms 54 on the spring 52 engage the base of the driving plate recesses. An intermediate actuator portion 56 engages the planar portion 40 of each strut.

Figure 8A:
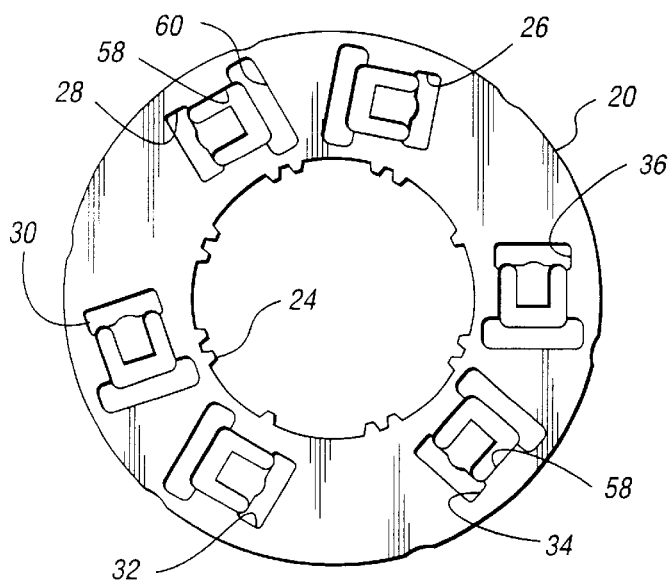
FIG. 8a is a plan view of the planar coupling driving plate which shows the recesses for retaining the springs of FIG. 7.
Figure 8B:
Figure 9A:
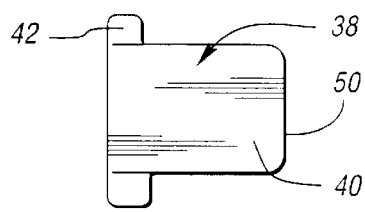
Figure 9B:
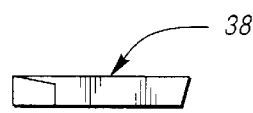
Figure 10:
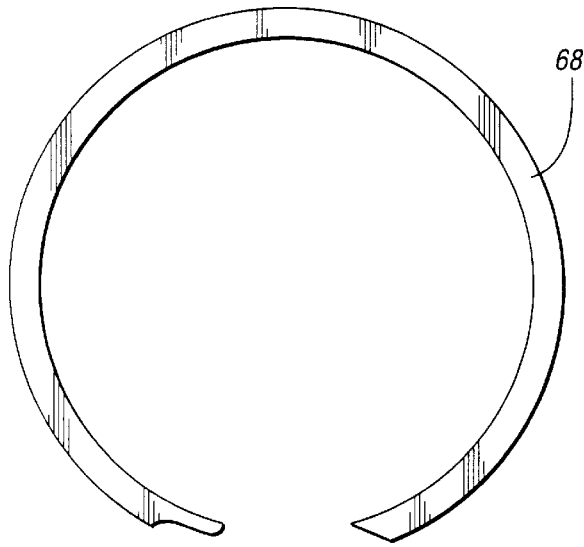
FIG. 10 is a plan view of a snap-ring that is used in the planar coupling assembly to retain the driving coupling plate in assembled relationship with respect to the driven coupling plate.

FIG. 8a shows a plan view of the driving coupling plate 20. Seen in FIG. 8a are recesses 26 through 36. Each recess has a pocket of generally horseshoe shape with sides that receive the arms 54 of the springs 52. The horseshoe shape pocket is illustrated in FIG. 8a at 58.

FIG. 8a also shows an elongated portion 60 of the recesses that receive the struts. The recesses 60 are sized so that the ear portion 42 at the pivotal edge of each strut can be secured in place.

The edge of each recess 48 in plate 10 that is engaged by an edge 50 of a strut is illustrated in FIG. 4 by reference numeral 62.

Figure 11A:
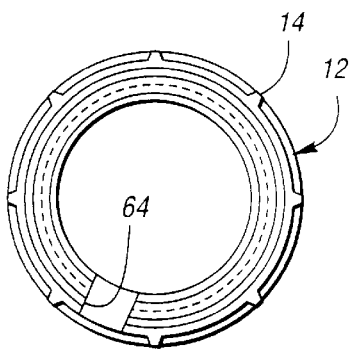
FIG. 11a is a view of the driving shaft with external splines that engage internal splines on the driving coupling plate.
Figure 11B:
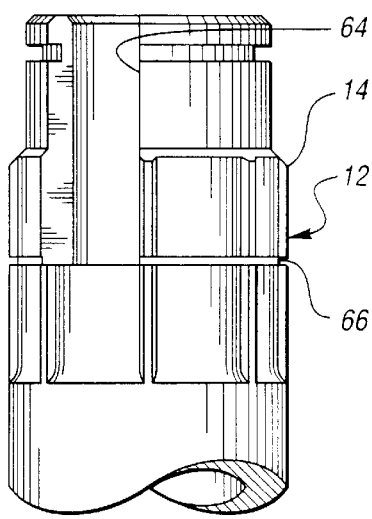

As seen in FIGS. 11a and 11b, the end of the shaft 12 is provided with an axially extending slot 64, which extends to a circumferential groove 66 formed in the portion of the shaft that is splined, as shown at 14. The inside diameter of the groove 66 generally is equal to the minor diameter of the splines 14.

When the coupling plate 20 is received within the coupling plate 10, the plates are held axially fast on the shaft 12 by retainer ring or snap-ring 68. This snap-ring is received in internal groove formed in the coupling plate 10, the groove being seen in FIG. 5a at 69.

When the coupling is assembled, the retainer plate 22 is located within the groove 66. As seen in FIG. 6b, retainer plate 22 is provided with internal splines 70, the minor diameter of the splines 70 being piloted on the base of the groove 66. The retainer plate 22 thus can move angularly about the axis A of the clutch. The retainer plate 22, as seen in FIG. 6a, is provided with an actuator tab 72, which is received in slot 64 in the shaft 12 when the coupling is assembled. This is best seen in FIG. 14. The actuator shaft 18 also is provided with a slot 74, as seen in FIG. 14. The inner extremity of the actuator tab 72 is received in this slot 74 in shaft 18.

The width of the slot 74 is substantially less than the width of the slot 64. Thus, when the actuator shaft 18 is indexed rotatably relative to the shaft 12, the retainer plate will be adjusted angularly about the axis of the coupling relative to the recesses in the driving coupling plate 20. When the actuator shaft 18 is moved in one direction, the retainer plate will be adjusted to a position that will retain one strut of each of the pairs of struts 26 or 28, 30 or 32, and 34 or 36, while permitting the other strut of each pair to pass through the apertures 46 into engagement with the recesses of the driven clutch plate 20. When the shaft 18 is rotatably indexed in the opposite direction, the other struts of each of the pairs of struts will be held in their respective recesses in the driving plate 20, while permitting the companion strut of each pair to enter the recesses of the driven coupling plate.

Figure 12A:
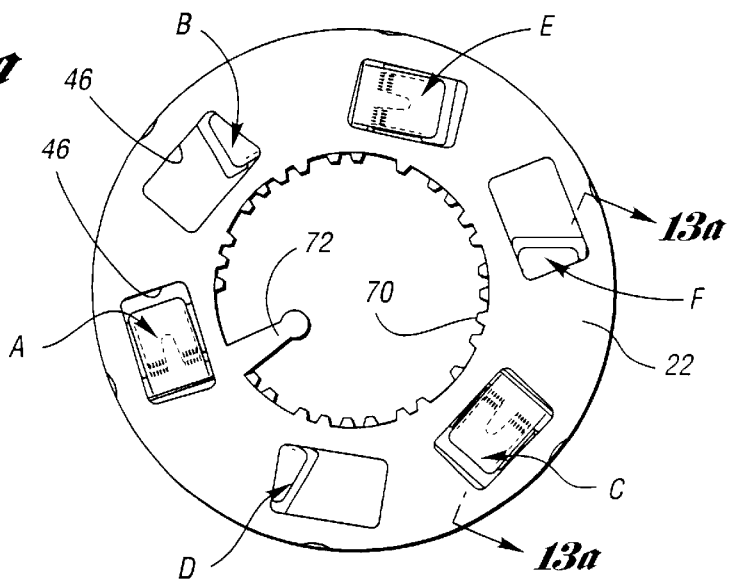
FIG. 12a is a partial assembly view showing the strut retainer plate, the struts, and the driving coupling plate in assembled relationship wherein the strut retainer plate is positioned angularly to permit torque delivery in one direction.
Figure 12B:
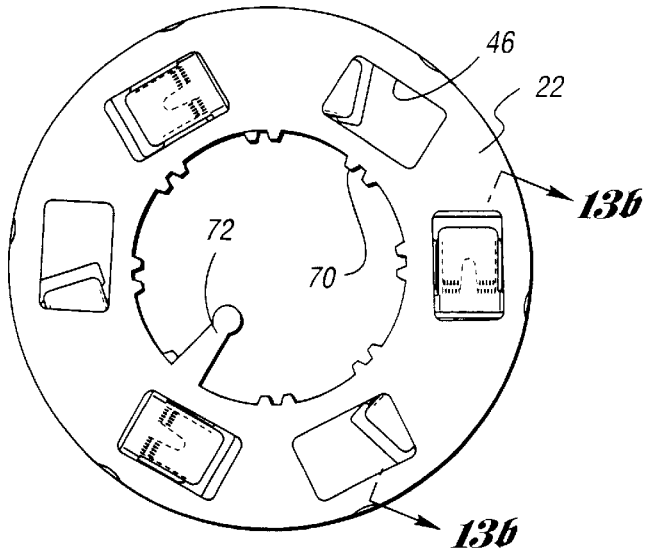
FIG. 12b is a view similar to FIG. 12a wherein the strut retainer plate is positioned to permit transfer of torque in the opposite direction.
Figure 12C:
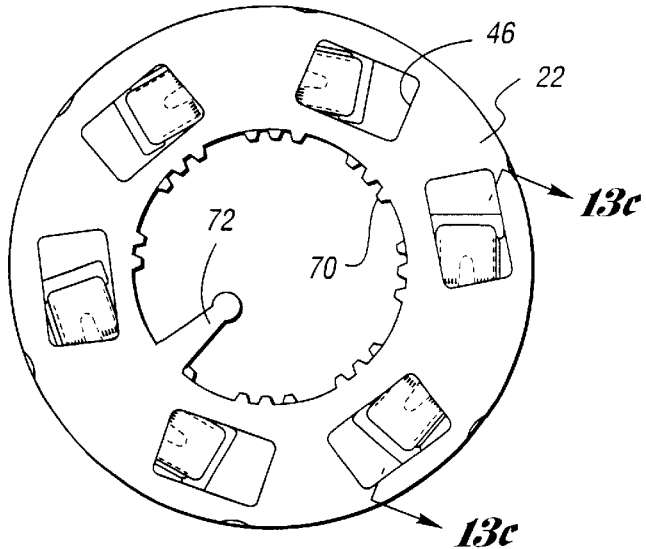
FIG. 12c is a view similar to FIGS. 12a and 12b wherein the retainer plate is positioned to permit free-wheeling motion in each direction.

FIGS. 12a, 12b and 12c show the three operating positions of the retainer plate 22. When the retainer plate 22 is positioned as shown in FIG. 12a, the strut at location A is in full registry with the aperture 46, whereas the strut at location B is out of registry with its aperture 46. Similarly, the struts at the companion locations C and D and the struts at the companion locations E and F have one strut out of registry and the other strut in full registry with the apertures 46.

When the plate 22 is adjusted to the angular position shown in FIG. 12b, the other strut of each pair of struts becomes misaligned with its respective aperture 46, while the companion strut of that pair fully registers with its aperture 46. This permits torque transfer in a direction opposite to the direction of torque transfer associated with FIG. 12a.

FIG. 12c shows the angular position of the retainer plate that will permit free-wheeling motion in both directions. In this instance, the plate 22 is adjusted angularly relative to the shaft 12 so that both struts of each pair of struts are out of registry with respect to their apertures 46.

Figure 13A:
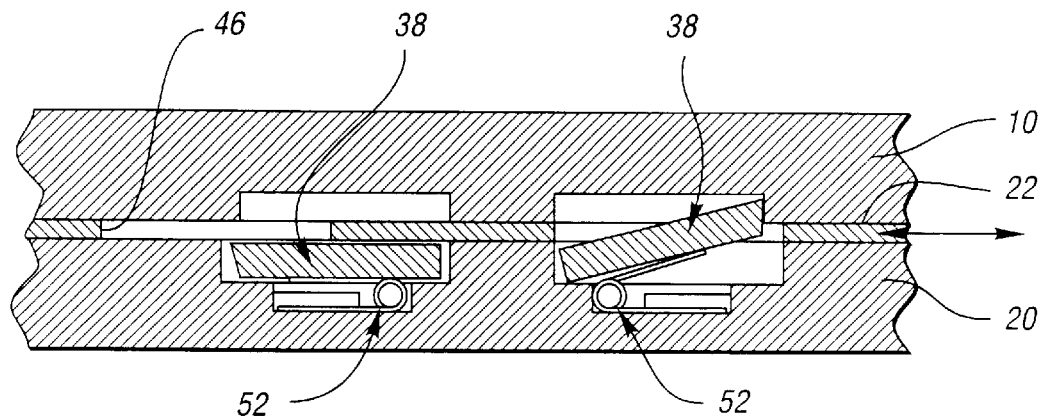
FIG. 13a is cross-sectional view of the planar coupling assembly wherein the strut retainer plate is positioned for torque transfer in a first direction.

FIG. 13a is a cross-sectional view that further illustrates the relationship of the struts with respect to the coupling plates 10 and 20 when the coupling is conditioned for torque transfer in the operating mode shown in FIG. 12a. The location of the springs 52 also is best seen in FIGS. 13a, 13b and 13c.

Figure 13B:
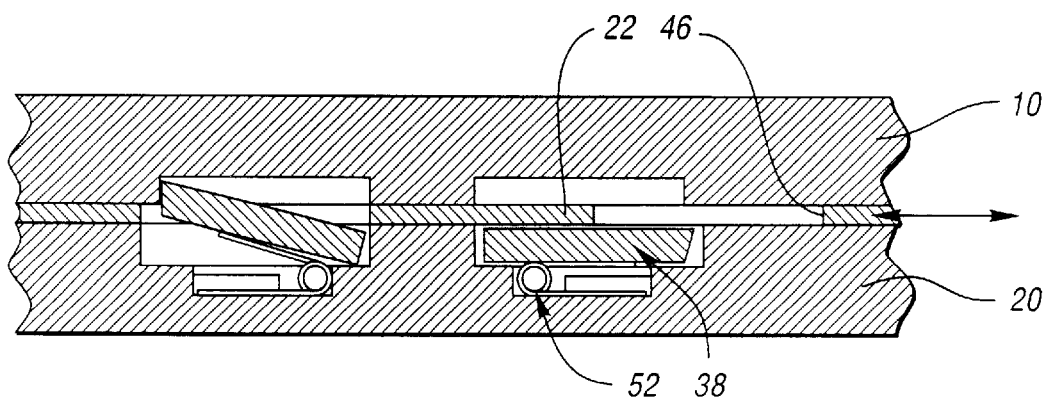
FIG. 13b is a view similar to FIG. 13a showing the strut retainer plate shifted angularly to a position that permits torque delivery in a second direction.
Figure 13C:
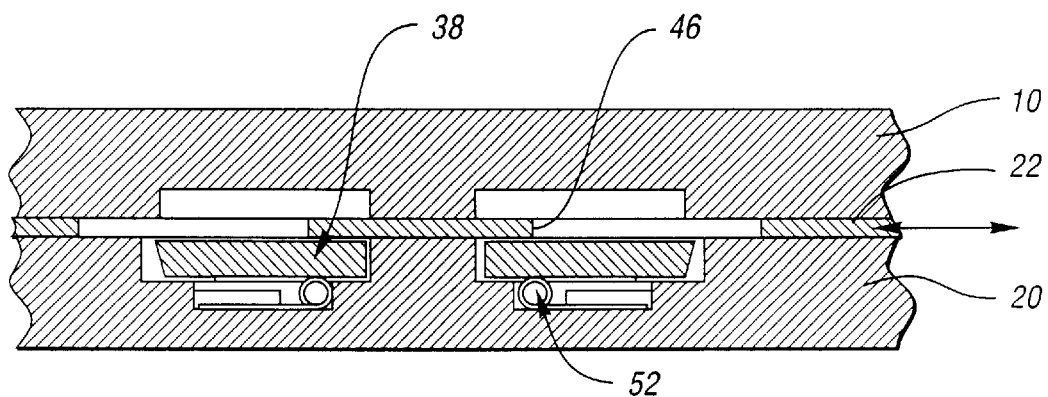
FIG. 13c is a view similar to FIGS. 13a and 13b wherein the strut retainer plate is moved to a position that will accommodate free-wheeling relative motion of the coupling plates in either rotary direction.

FIG. 13b shows the position of the retainer plate 22 relative to the plates 10 and 20 when torque is delivered in a direction opposite to the direction for the operating mode of FIG. 13a. FIG. 13c shows a position of the retainer plate 22 relative to the plates 10 and 20 when the assembly is conditioned for the operating mode in which free-wheeling motion can occur in each direction.

Figure 15A:
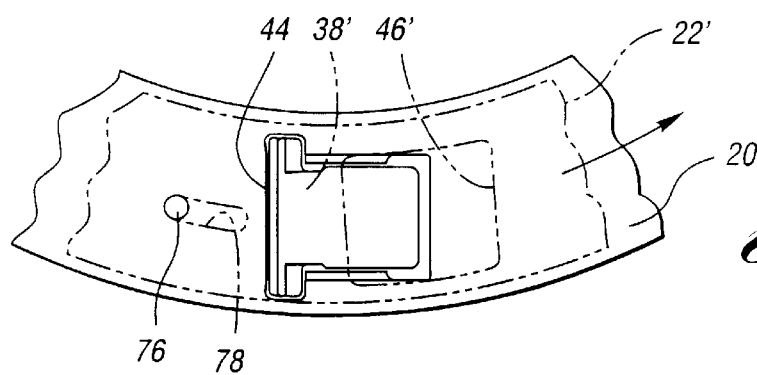
FIG. 15a is a view of a modified planar coupling assembly that is adapted for torque transfer in one direction, but which permits free-wheeling relative motion of the coupling plates in the opposite direction, the strut retainer plate being positioned to permit free-wheeling motion.
Figure 15B:
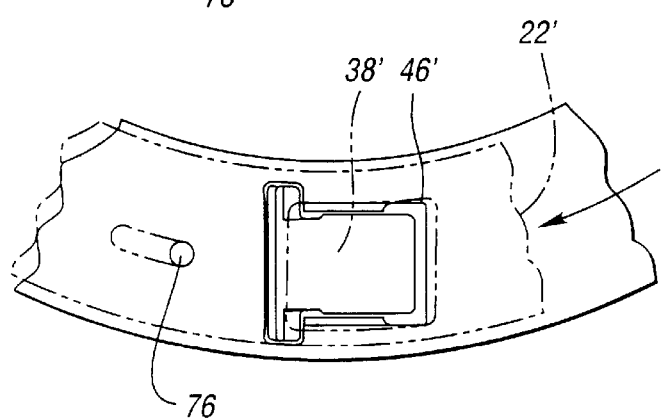
FIG. 15b is a view similar to FIG. 15a wherein the strut retainer plate is positioned for permitting torque transfer from one coupling plate to the other.

We have shown in FIGS. 15a and 15b an embodiment of the invention wherein torque can be transferred in one direction but not in the opposite direction. Free-wheeling motion in the opposite direction, however, is accommodated. In FIG. 15a, the retainer plate 22' is adjusted to a position relative to the plate 20' so that the apertures 46' are out of registry with respect to the recesses in the coupling plates. The retainer plate 22' then will prevent pivotal motion of the struts 38' about their respective pivotal edges 44. The coupling in the operating mode shown in FIG. 15a will permit free-wheeling motion. When the assembly assumes the position shown in FIG. 15b, the retainer plate 22' is indexed so that the apertures 46' fully register with the recesses in the coupling plates. This permits the struts 38' to engage the recesses in the driven coupling plate.

The elements of the embodiment of FIGS. 15a and 15b that have a counterpart in the embodiment of FIGS. 1–14 carry prime notations on corresponding reference numerals.

The plate 20' in the embodiment shown in FIGS. 15a and 15b carries a locator pin 76 which is received in a slot 78 in the retainer plate 22. This pin and slot arrangement limits the angular displacement of the retainer plate 22 so that it will assume either one position or the other. In FIG. 15b, the pin registers with one end of the slot to permit full registry of the apertures 46 with respect to the recesses in the coupling plates.

When torque transfer through the coupling structure terminates and the coupling assembly assumes the overrunning mode shown in FIG. 15a, the retainer plate 22 will be dragged by the fluid dynamic drag forces in the lubricating oil so that it is indexed to the position shown in FIG. 15a during the overrunning operating mode. Upon a torque reversal, the drag forces on the retainer plate 22' are reversed, thereby allowing the apertures 46' to register with the recesses and the coupling plates and establish a one-way torque transfer path.

It will be apparent to persons skilled in the art that modifications to the embodiments of the invention described and illustrated in this disclosure may be made without departure from the scope of the following claims.

What is claimed is:

1. A planar coupling assembly comprising:

a first coupling plate and a second coupling plate, said coupling plates being rotatable about a common axis and having juxtaposed coupling faces in closely-spaced opposition, one with respect to the other;

strut recesses formed in each coupling plate face at angularly spaced locations about said axis;

a plurality of struts in said first coupling plate, said struts and said strut recesses in said first coupling plate defining a pivot means for each strut for establishing pivotal motion of said strut about a pivotal edge thereof to thereby maintain the pivotal edge of each of said struts in a substantially-fixed angular relation with a respective one of said strut recesses in said first coupling plate;

spring means in said strut recesses urging each of said struts for pivotal motion about the pivotal edge thereof;

a strut retainer plate between said coupling faces, said strut retainer plate having angularly spaced apertures for selectively receiving said struts in said first coupling plate as said struts pivot about the respective pivotal edges thereof;

said struts engaging said recesses in said second coupling plate when said strut retainer plate assumes a first angular position relative to said first coupling plate and said struts;

said strut retainer plate retaining said struts in said recesses in said first coupling plate when said strut retainer plate assumes a second angular position relative to said first coupling plate and said struts; and means for effecting angular movement of said strut retainer plate relative to said first coupling plate and said struts to permit torque transfer between said coupling plates when said strut retainer plate is in the first angular position relative to said first coupling plate and to permit free-wheeling relative motion of said coupling plates, one with respect to the other, when said strut retainer plate is in the second angular position relative to said first coupling plate.

2. The coupling assembly as set forth in claim 1 wherein said coupling plates are supplied with lubrication oil, said lubrication oil establishing fluidic drag forces on said strut retainer plate when said coupling plates overrun, one with respect to the other, thereby shifting said strut retainer plate between an overrunning position and a torque transfer position to effect one-way torque delivery between said coupling plates.

3. The coupling assembly as set forth in claim 2 wherein said first coupling plate and said strut retainer plate include a pin and slot connection therebetween, wherein the pin engages the slot to define a first relative position to effect an overrunning mode and a second relative position to effect a torque transfer mode.

4. A planar coupling assembly comprising:
   a first coupling plate and a second coupling plate, said coupling plates being rotatable about a common axis and having juxtaposed coupling faces in closely spaced opposition, one with respect to the other;
   strut recesses formed in each coupling plate face at angularly spaced locations about said axis;
   a plurality of struts in said first coupling plate, said struts and said strut recesses in said first coupling plate defining a pivot means for each strut for establishing pivotal motion of said strut about a pivotal edge thereof;
   spring means in said strut recesses urging each of said struts for pivotal motion about the pivotal edge thereof;
   a strut retainer plate between said coupling faces, said strut retainer plate having angularly spaced apertures for selectively receiving said struts in said first coupling plate as said struts pivot about the respective pivotal edges thereof;
   said struts engaging said recesses in said second coupling plate when said strut retainer plate assumes one of a first angular position and a second angular position relative to said first coupling plate;
   said strut retainer plate retaining said struts in said recesses in said first coupling plate when said strut retainer plate assumes a third angular position relative to said first coupling plate; and
   means for effecting angular movement of said strut retainer plate relative to said first coupling plate to permit torque transfer between said coupling plates when said strut retainer plate is in the first or the second angular position relative to said first coupling plate and to permit free-wheeling relative motion of said coupling plates, one with respect to the other, when said strut retainer plate is in the second angular position relative to said first coupling plate,
   wherein said strut recesses of said first coupling plate are organized in pairs, each of said strut retainer plate apertures registering with a respective first recess of each of said pairs of strut recesses when said strut retainer plate assumes the first angular position relative to said first coupling plate and registering with a respective second recess of each of said pairs of strut recesses when said strut retainer plate assumes the second angular position relative to said first coupling plate;
   said strut retainer plate apertures being out of registry with said first coupling plate recesses when said strut retainer plate assumes the third angular position relative to said first coupling plate, whereby said strut retainer plate maintains said struts within each recess in said first coupling plate to effect a free-wheeling operating mode in each direction.

5. The coupling assembly as set forth in claim 4 wherein said strut retainer plate includes an actuator portion, and wherein said-means for effecting anngular movement includes an actuator means engageable with the actuator portion of said strut retainer plate for angularly indexing said strut retainer plate from one of said angular positions to another, thereby changing the operating mode for free-wheeling relative motion in both directions, for torque transfer in one direction and free-wheeling relative motion in the opposite direction and for torque transfer in the other direction, and free-wheeling relative motion in the opposite direction.

6. The coupling assembly as set forth in claim 5, wherein said actuator portion of said strut retainer plate comprises an actuator tab on said strut retainer plate that extends radially inward relative to one of said coupling plates, and wherein said means for effecting angular movement includes an actuator shaft within said one of said coupling plates engageable with the actuator tab of said strut retainer plate, whereby said strut retainer plate is adjustable angularly relative to said one of said coupling plates upon rotary indexing motion of said actuator shaft relative to said one of said coupling plates.

7. A planar coupling assembly comprising:
   a first coupling plate and a second coupling plate, wherein the coupling plates are rotatable about a common axis and have juxtaposed coupling faces in closely spaced opposition, and wherein each coupling plate has a plurality of recesses defined in the coupling face at angularly-spaced locations thereabout relative to the axis, each recess including at least one edge;
   a plurality of struts carried within the recesses of the first coupling plate such that a first end of each strut is maintained in substantially fixed relation to a respective edge of a given recess of the first coupling plate, wherein each strut is movable from a first position to a second position, the first position being characterized by an engagement of a second end of the strut with the second coupling plate, and the second position being characterized by a nonengagement of the second end of the strut with the second coupling plate;
   a spring urging each strut toward the first position;
   a strut retainer plate disposed between the coupling faces of the coupling plates and mounted for limited shifting movement relative to the first coupling plate, wherein the strut retainer plate includes a plurality of apertures defined at angularly-spaced locations thereabout relative to the axis, the strut retainer plate being operative to selectively permit a given strut to assume the first position thereof when the strut retainer plate is in a first angular position relative to the given strut, and for selectively holding the given strut in the second position thereof when the strut retainer plate is in a second angular position relative to the given strut; and
   means for effecting angular movement of the strut retainer plate relative to the first coupling plate and the struts.

8. The coupling assembly as set forth in claim 7, wherein the strut retainer plate includes an actuator portion, and wherein the means for effecting angular movement of the strut retainer plate includes an actuator means engageable with the actuator portion of the strut retainer plate for angularly indexing the strut retainer plate relative to the first coupling plate and the struts.

9. The coupling assembly as set forth in claim 8, wherein the actuator portion of the strut retainer plate includes an actuator tab on the strut retainer plate that extends radially inward relative to one of the coupling plates, and wherein the actuator means includes an actuator shaft within the one of the coupling plates engageable with the actuator tab of the strut retainer plate, whereby the strut retainer plate is adjustable angularly relative to the one of the coupling plates upon rotary indexing motion of the actuator shaft relative to the one of the coupling plates.

10. The coupling assembly as set forth in claim 7, wherein the given strut extends through a respective aperture in the strut retainer plate to assume the first position thereof when the strut retainer plate is in the first angular position relative to the given strut.

11. A planar coupling assembly comprising:

a first coupling plate and a second coupling plate, wherein the coupling plates are rotatable about a common axis and have juxtaposed coupling faces in closely spaced opposition, and wherein each coupling plate has a plurality of recesses defined in the coupling face at angularly-spaced locations thereabout relative to the axis, each recess including at least one edge;

a plurality of struts carried within the recesses of the first coupling plate such that a first end of each strut is maintained in substantially fixed relation to a respective edge of a given recess of the first coupling plate, wherein each strut is movable from a first position to a second position, the first position being characterized by an engagement of a second end of the strut with the second coupling plate, and the second position being characterized by a nonengagement of the second end of the strut with the second coupling plate;

a spring urging each strut toward the first position;

a strut retainer plate disposed between the coupling faces of the coupling plates and mounted for limited shifting movement relative to the first coupling plate, wherein the strut retainer plate is operative to selectively permit a given strut to assume the first position thereof when the strut retainer plate is in a first angular position relative to the given strut, and for selectively holding the given strut in the second position thereof when the strut retainer plate is in a second angular position relative to the given strut; and means for effecting limited angular movement of the strut retainer plate relative to the struts to permit torque transfer between the coupling plates when the strut retainer plate is in the first angular position relative to the first coupling plate and to permit free-wheeling relative motion of the coupling plates, one with respect to the other, when the strut retainer plate is in the second angular position relative to the first coupling plate.

12. The coupling assembly as set forth in claim 11, wherein the strut retainer plate includes an actuator portion, and wherein the means for effecting angular movement of the strut retainer plate includes an actuator means engageable with the actuator portion of the strut retainer plate for angularly indexing the strut retainer plate relative to the first coupling plate and the struts.

13. The coupling assembly as set forth in claim 12, wherein the actuator portion of the strut retainer plate includes an actuator tab on the strut retainer plate that extends radially inward relative to one of the coupling plates, and wherein the actuator means includes an actuator shaft within the one of the coupling plates engageable with the actuator tab of the strut retainer plate, whereby the strut retainer plate is adjustable angularly relative to the one of the coupling plates upon rotary indexing motion of the actuator shaft relative to the one of the coupling plates.

14. The coupling assembly as set forth in claim 11, wherein the strut retainer plate includes a plurality of apertures defined at angularly-spaced locations thereabout relative to the axis such that the given strut extends through a respective aperture in the strut retainer plate to assume the first position thereof when the strut retainer plate is in the first angular position relative to the given strut.

* * * * *